United States Patent
Rao et al.

(10) Patent No.: US 7,237,717 B1
(45) Date of Patent: Jul. 3, 2007

(54) SECURE SYSTEM FOR ELECTRONIC VOTING

(75) Inventors: Raman Rao, Palo Alto, CA (US); Rekha Rao, Palo Alto, CA (US); Sunil Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 705 days.

(21) Appl. No.: 10/705,739

(22) Filed: Nov. 8, 2003

Related U.S. Application Data

(63) Continuation-in-part of application No. 09/597,607, filed on Jun. 20, 2000, which is a continuation of application No. 09/642,872, filed on Aug. 21, 2000, now Pat. No. 6,480,587, which is a continuation of application No. 09/281,739, filed on Jun. 4, 1999, now Pat. No. 6,169,789, which is a continuation-in-part of application No. 08/764,903, filed on Dec. 16, 1996, now abandoned.

(51) Int. Cl.
*G06F 17/60* (2006.01)
(52) U.S. Cl. .......................... 235/386; 705/12
(58) Field of Classification Search ............... 235/386; 705/12
See application file for complete search history.

(56) References Cited

U.S. PATENT DOCUMENTS

| | | | | |
|---|---|---|---|---|
| 2004/0195323 | A1* | 10/2004 | Vadura et al. | 235/386 |
| 2005/0218224 | A1* | 10/2005 | Boldin | 235/386 |

\* cited by examiner

*Primary Examiner*—Michael G. Lee
*Assistant Examiner*—Allyson N Trail
(74) *Attorney, Agent, or Firm*—Courtney Staniford & Gregory LLP

(57) ABSTRACT

An electronic voting system comprising of one or more intelligent fixed in place voting machines, mobile voting machines and one or more trusted servers connected by secure wired or wireless communication means to enable electronic voting. A secure system for electronic voting by means of dynamically reconfiguring the mobile device as a mobile voting machine, said mobile voting machine communicating voice and data information with one or more trusted election servers to enable electronic voting in real time by leveraging the processing power/databases resident on the mobile device and or the processing power/databases resident on the trusted election servers. A system for providing disabled voters with enhanced utility by means such as language translation, speech recognition and other features by enabling the desired and enhanced functionality by using the processing power of the mobile device by itself and or in conjunction with the processing power of the local, central and or network server.

47 Claims, 6 Drawing Sheets

SECURE SYSTEM FOR ELECTRONIC VOTING

CROSS REFERENCE TO RELATED PATENT APPLICATIONS

The present application is a continuation-in-part of co-pending parent application Ser. No. 09/597,607, filed Jun. 20, 2000, which is continuation of application Ser. No. 09/642,872, filed Aug. 21, 2000, now U.S. Pat. No. 6,480,587, issued Nov. 12, 2002, which is a continuation of application Ser. No. 09/281,739, filed Jun. 4, 1999, now U.S. Pat. No. 6,169,789, issued Jan. 2, 2001, which is a continuation-in-part application of a now abandoned application entitled A SYSTEM LEVEL SCHEME TO CONTROL INTELLIGENT APPLIANCES, Ser. No. 08/764,903 filed Dec. 16, 1996, now abandoned.

BACKGROUND OF THE INVENTION

In the prior art the citizen of a country faces many daunting obstacles in exercising the right to vote in the local, state or national elections. The prior art system generally requires that the individual citizen by physically present at the polling station and exercise the right to cast the ballot in the confines of the voting booth.

In recent times, the ability to cast the vote by choosing the absentee ballot method is being made more available for a number of reasons that include reduced cost to the county and fewer and fewer polling workers and places being available each year in a proximate location to the voter. However, the absentee ballot method requires that the election authorities prepare and send the ballots by postal means early enough for the citizen to receive the ballot. The absentee ballot method further imposes an undesirable constraint on the voter by requiring that the ballot must be physically returned by the postal means to the county registrar before the polls close, which generally means at the end of the normal final delivery time of the polling day.

The prior art absentee ballot method thus imposes an additional and undesirable requirement on the voter who chooses this method of voting, requiring the voter to select and cast the vote well in advance as compared to other citizens who physically vote at the polling station and are thus able to make their choice at the very last minute. It is imperative that the latest and best information is available to the voter at all times for the voter to make an informed choice. In a dynamically changing world, the fame, fortune, the positions on the issues and general information about the candidate is fast changing and so are the world events. Hence, there is an acute need to enable a system that allows the voter to cast the vote in a timely manner of the voters choosing, during the approved balloting window as determined by the election authorities. Additionally, disabilities, infirmities, time off from work, transportation and other constraints prevent the voter from easily exercising the inherent right to vote enshrined in a vibrant democracy.

In addition, there is another distinct difference between the absentee ballot method and the methods used for casting the vote at a polling station in the voting booth. The voting systems used in the voting booth are machine based whereas the absentee ballots are punch card based. There is a transition underway to touch screen enabled voting machines as the punch card method is now considered as error prone due to hanging chads and other limitations that are quite well known after the US presidential elections of the year 2000. The number of absentee ballots being cast is significantly high and moving higher every election period. Consequently the absentee ballots represent the margin for victory or defeat. Yet, as stated in here the inability of the absentee voter to exercise the right to vote at the desired time and the related lack of timely information further coupled with the differences in the methods of the actual ballots makes the entire voting process error prone and shakes the very foundations of democratic choice and governance irrespective of the voters party affiliation.

In the prior art the voters speak and read different languages. The election authorities are required to print and provide voting information and ballots in a plurality of languages at considerable expense. In addition, the voters that speak minority languages are often intimidated by the process and tend to participate in the voting in elections at a lower participation level.

In addition, the level of participation in most elections is far less than desirable. Consequently, the outcome of some elections may be determined by very few voters with the absentee votes being a significant factor in the election outcome. Yet, for a democratic system to reflect the views of the electorate, a significant majority of the eligible voters must participate and exercise their vote in a fully informed manner with convenience and relative ease.

The prior art touch screen enabled fixed in place voting machines are a definite improvement over punch cards but do not address the issues highlighted above, especially the mobility issue. In addition the touch screen enabled voting machines of the prior art are not directly connected to the servers nor are they operating in real time. It is therefore anachronistic, that as we move very fast into a highly connected digital world, the very means of exercising our right to vote is constrained by methods and systems that do not keep pace, are antiquated and prone to error and legal challenges. In addition, the special recall elections enable the participation of a very large number of candidates on the ballot leading to confusion and the difficulty of selecting the candidate desired by the voter.

The prior art relies on voting machines that have removable memory cards and a built in hard drive and a means for activation of the voting machine by use of an activation card issued to the voter by the polling personnel. The memory cards are collected by the election officials and inserted into computers that then read the data from the cards. In the prior art the votes/voting data then is hand delivered to the county election office or the data subsequently transmitted over a telephone line. In the event a recount is requested the county officials recount the data from the memory cards. In the event a hand count is requested, the county election officials take a print out and calculate by hand from these prints outs. Consequently this archaic and elaborate process is fraught with the potential for errors and even fraud. As an example the level of redundancy to the memory card is only the hard drive in that particular voting machine. This is only a low level of redundancy and fraud protection. In addition in the prior art the voter is not enabled to receive a print out of the way the votes were cast which is a limitation. Therefore the present invention addresses a real world problem that requires a solution and solves the problem by novel means by fully leveraging the power/databases of the mobile devices, the availability of wired or wireless connectivity and the power/databases of the trusted escrow servers.

The present invention in a unique and novel manner discloses the methods for solving these enumerated problems of the prior art and enabling the highly mobile electorate to cast the ballots in a manner that levels the playing field while enhancing the security and integrity of the election process utilizing one or more types of touch screen enabled mobile devices. The present invention also enables the casting of votes in commercial applications using mobile devices such as voting on various proxy matters of a company and other applications.

SUMMARY OF THE INVENTION

It is an object of the present invention to enable electronic voting and related operations by the use of one or more types of mobile devices that are configured with keyboard and or touch screen input/output and display capabilities.

It is an object of the present invention to enable electronic voting by the use of one or more types of mobile devices having communication, computation and control features; and said mobile devices being further configured with keyboard and or touch screen input/output capabilities.

It is an object of the present invention to enable electronic voting by the use of one or more types of mobile devices having communication, computation and control features; and said mobile devices being further configured with standard, partial or special function keyboard, and or touch screen input/output capabilities and or voice/audio input/output capabilities.

It is an object of the present invention to enable electronic voting and other functions by means of the mobile device operating in a stand alone manner and or in conjunction with a local, central or network server.

It is an object of the present invention to provide timely information on the mobile device by touch screen method, text method, video method, photographic method, image method, graphics method, data method, voice method and audio method relating to the candidates, candidate profiles, issues, positions and other relevant matters.

It is an object of the present invention to enable multiple windows in a touch screen enabled display window for easy navigation back and forth for intelligent and informed voting.

It is an object of the present invention to enable language translation of various types of data and information and further enable of the means for input and output by one or more methods in one or more languages.

It is an object of the present invention to enable language translation for electronic voting and other functions by means of the mobile device operating in a stand alone manner and or in conjunction with a local, central or network sever.

It is an object of the present invention to enable electronic voting and other actions by one or more input/output methods inclusive of standard keyboard, full function or partial keyboard, macro functions, touch screen, voice, sound, audio function means of the mobile device operating in a stand alone manner and or in conjunction with a local, central or network sever.

It is an object of the present invention to enable electronic voting by hearing impaired, vision impaired and other disabled voters by enabling one or more input/output methods as desired by the user, inclusive of standard keyboard, full function or partial keyboard, macro functions, touch screen, voice, sound, audio function means, said functions being configured on the mobile device operating in a stand alone manner and or in conjunction with a local, central or network sever.

It is an object of the present invention to enable the voters who do not know how to read and write, as is the case in a number of developing countries, to exercise the right to vote by symbols, icons, figures, and other visual indicators that are more readily recognizable by the voter as representing a specific candidate or ballot measure.

It is an object of the present invention to enable access by the voter to the candidate's profile, photos, video and other information in a contemporaneous manner on the mobile device such that the voter is capable of comparing the different candidates and different issues before casting the vote.

It is an object of the present invention to enable authentication of the voter by the local, central and or network server by one or means inclusive of photo, driver's license, passport, social security or similar identification cards, video, audio, voice print, finger print, retinal print, digital signature, handwriting recognition, signature recognition, the unique mobile device identification number and other similar means not enumerated herein.

It is an object of the present invention to enable authentication of the voter's unique identifying attributes by comparison with various lookup tables/databases resident on the mobile device itself and or in conjunction with the lookup tables/databases resident on the local, central and or network servers.

It is an object of the present invention to utilize the high speed wired or wireless communication capabilities of the mobile device and the servers for encrypted and secure connectivity using various mobile devices identification methods such as IPv6 and other methods.

It is an object of the present invention to leverage and effectively use the tremendous processing power of the mobile device by itself and or in conjunction with the local, central and or network servers, said servers having one or more levels of trust and being maintained by designated election authorities, to execute the authentication, encryption, security, secure high speed communication, secure communication at other speeds, and other enabling features of mobile electronic voting.

It is an object of the present invention to enable a unique electronic key to be assigned by the central trusted server to the voter/mobile device, said server being under the control of un impeachable and trusted election organizations which are further monitored by non partisan organizations and boards.

It is an object of the present invention to validate the electronic key based on the voter profile only and or the voter in conjunction with the unique identity of the mobile device owned by the user.

It is an object of the present invention to time stamp the voting action by the voter in conjunction with the mobile device and or the servers.

It is an object of the present invention to enable the capture and storage of the actual manner in which the voter cast the votes, frame by frame or a summary of the frames, on the mobile device storage.

It is an object of the present invention to enable for the real time provision of a validated electronic receipt which includes the actual voter selections and time stamp, such validation being executed by the trusted election server and provided to the voter/mobile device.

It is an object of the present invention to preclude voting multiple times by the same voter by authenticating the specific voter by finger print, voice print, retinal print or other means and keeping track of the real time actions of the voter in a database that is maintained on a trusted server and updated in real time.

It is an object of the present invention to location stamp the voting action by the voter in conjunction with the mobile device and or the servers and GPS servers.

It is an object of the present invention to enable voting by handicapped individuals with the assistance of an approved and or trusted individual whose identity, signatures and relevant data is recorded by the central election server via the mobile device touch screen or other interface.

It is an object of the present invention to provide full and complete election results immediately after the polls close by leveraging the real time computational capabilities of the servers under the control of the election body.

It is an object of the present invention to enable the time-locking of the servers, said time lock beginning at a prescribed time and ending at a set time, to ensure that unauthorized and premature access to the polling data and results is precluded and to avoid premature release of the polling information before the polls officially close.

It is an object of the present invention to provide for a means for over riding the time lock with the authentication and permission of trusted and neutral parties in the extreme event of an emergency that warrants the override feature.

It is an object of the present invention to provide for a time-lock and or function-lock on the election servers to ensure that unauthorized access and other intrusive functions are not permitted during the duration of the designated period.

It is an object of the present invention to provide if needed a hierarchy of servers that are under the control of local, state or national election authorities to meet the needs of the local, state and federal laws.

It is an object of the present invention to maintain a redundant servers and storage as appropriate at the same or different locations for fail safe purposes.

It is an object of the present invention to enable the data to be periodically swept and stored in multiple secure locations to ensure real time redundancy and security.

It is an object of the invention to maintain valid voter rolls based on eligibility on a secure central server or servers and enable the dynamic validation of the request to cast the ballot by the voter.

It is an object of the present invention to create an improved fixed in place touch screen enabled voting machine such that the voters have the option of going to the polling place and casting their votes or using the touch screen enabled mobile device to cast their votes.

It is an object of the present invention to enable military service personnel and other citizens that are outside the country or a designated geographical area to participate in the elections in the event the laws permit the participation by the voter by using the mobile device.

It is an object of the present invention to enable students and other transient individuals to participate in the elections using the mobile device.

It is an object of the present invention to enable the mobile device to be configured for one or more types of communication protocols such that the mobile device conforms to the desired communication protocols and parameters defined by the election authorities.

It is an object of the present invention that a single mobile device is capable of various communication, computation and control applications and is further enabled for electronic voting at the desired time and for the desired elections.

It is an object of the present invention to enable other types of voting such as for corporate proxy voting and for other voting applications by means of a mobile device.

It is an object of the present invention to enable auctions and bidding by means of the mobile device by itself and or in conjunction with a local, central and or network server utilizing the processing power of the mobile device by itself and or in conjunction with a local, central and or network server.

It is an object of the present invention to enable the stationary devices configured with touch screens, mobile devices configured with touch screens and intelligent touch screen enabled voting machines located at the polling station to be used in a uniform and identical manner to meet the requirements of the election authorities by communicating with the trusted servers of the election authorities by wired or wireless means while protecting the confidentiality of the ballot.

It is an object of the present invention to enable opinion surveys and other polls by using the processing power of the mobile device by itself and or in conjunction with the local, central and or network server.

Other objects, features and advantages of the present invention will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the invention and, together with the description, serve to explain the principles of the present invention.

DETAILED DESCRIPTION OF THE INVENTION

The present invention provides a means wherein the Intelligent Voting Machine, hereafter referred to as IVM for the sake of brevity, is enabled with a number of intelligent features such as a touch screen enabled screen for input and output and the ability to be connected to trusted servers at the local precinct level, the county level and the state level by secure wired or wireless means.

The present invention additionally provides a means for configuring the intelligent voting machine, IVM, with features such as a microphone and speaker for voice and sound input/output for utility for the vision impaired or language impaired voters.

The present invention provides a means for configuring the intelligent voting machine, IVM, with Braille enabled keyboard for utility to the vision impaired voters.

The present invention provides a means for configuring the touch screen input with symbol driven selection method for utility to the reading and writing impaired voters.

The present invention enables the standard touch screen enabled mobile communication device to be configured as a Mobile Voting Machine, here after referred to as the MVM for the sake of brevity. The present invention provides a means for wired or wireless communication by the mobile communication device with trusted servers.

The present invention provides a means for dynamic configuration of the standard touch screen enabled mobile communication device as a MVM with a number of features such as language translation for use by language impaired voters, voting by symbols for reading/writing impaired voters, voting by sound, voice and audio for vision impaired voters and voting by a Braille special keyboard for vision impaired voters.

The present invention generally enables secure and convenient means of voting and provides numerous advantages to the voters by providing a means for voting by the mobile communication device configured as a MVM or alternately the ability to use an intelligent voting machine, IVM located at the polling station.

The present invention enables the stationary devices configured with touch screens, mobile devices configured with touch screens and intelligent touch screen enabled voting machines located at the polling station to be used in a uniform and identical manner to meet the requirements of the election authorities, by communicating by wired or wireless means with the trusted servers maintained by the election authorities.

The present invention provides a means for leveraging the built in processing power of the IVM and the MVM in a stand alone manner and or in conjunction with various levels of trusted servers to provide the desired functionality, utility, security and convenience to the voter.

These features and other novel features are described in detail to further illustrate and explain with reference to the appended figures.

Figure 1:
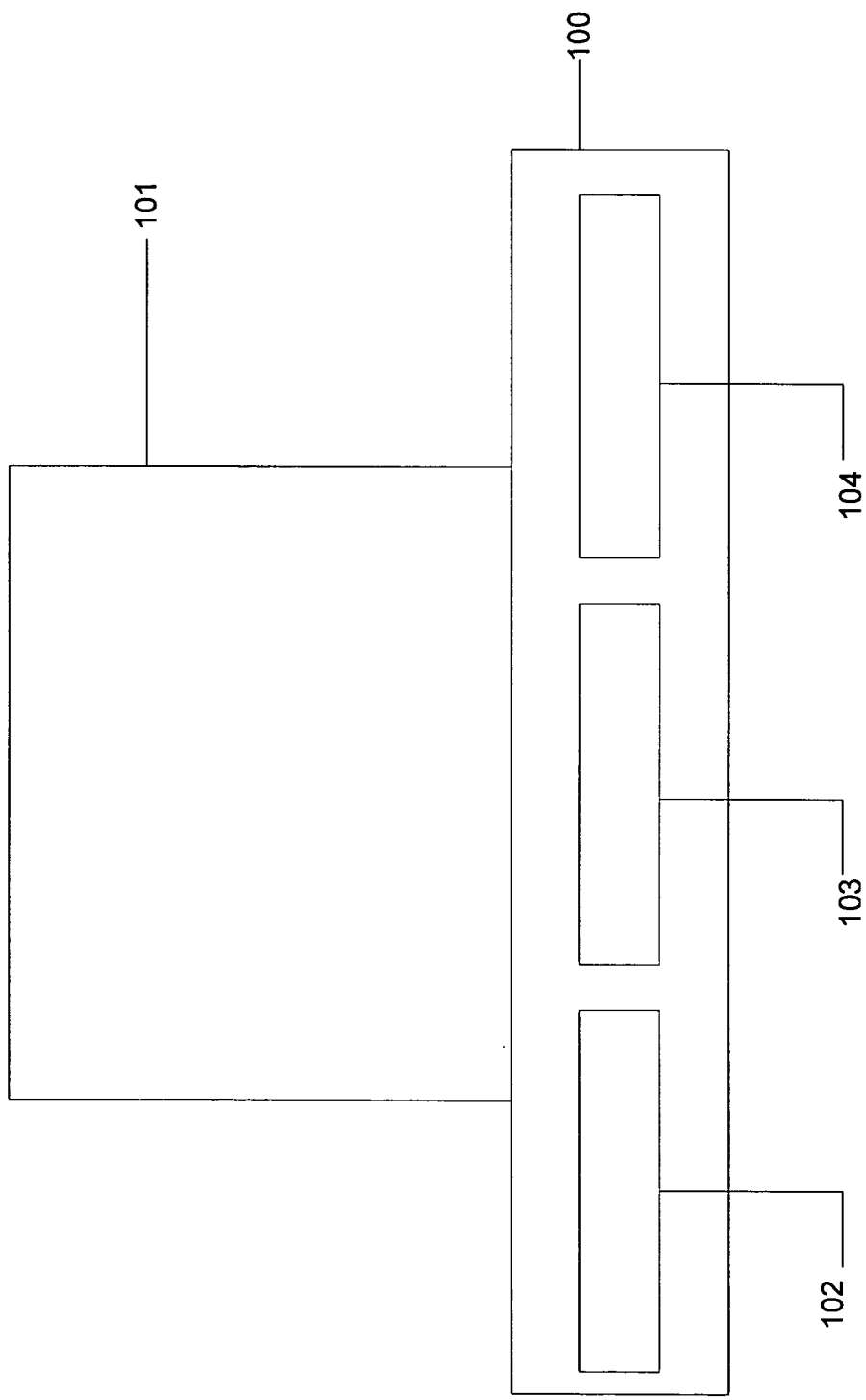
FIG. 1 shows a fixed in place stand alone touch screen enabled Prior Voting Machine, PVM, of the prior art that is not networked nor enabled with intelligence.

Referring now to FIG. 1 in detail, the touch screen enabled voting machine of the prior art is illustrated to show/contrast and further teach the unique distinguishing features of the present invention. The voting machine of the prior art 100, consists of a touch screen 101 for input/output and display, a hard disk drive 102 for storage of the votes cast on that particular machine, a removable magnetic/memory storage card 103 for storage of the votes cast on that particular voting machine and a card reader 104 for activation of the voting machine.

It is readily apparent that the voting machine of the prior art does not enable the voter to receive a print out of the manner in which the voter has cast the votes nor does it provide a receipt. With this limitation the voter is unsure if the specific votes that are cast by the voter on one or more line items and or in total have been recorded properly. This is a very dissatisfying experience and presents potentially for errors and fraud. Additionally the hard disk drive, 102 has no redundancy and should the hard disk drive crash the votes already cast on that voting machine may not be retrievable for ever and or in counted in time for inclusion in the official results. The memory storage card, 103 is further used in reading the votes recorded on it by means of insertion into a separate computer. The memory card 102 has the potential of being damaged, lost or fraudulently switched presenting a potential security flaw since many memory cards have to be handled at the election time. While the hard drive and memory card are redundant and contain the same information, this level of redundancy is not adequate. The voting machine is activated by the voter by means of an activation card, 104 issued by the polling workers to the voter at the time of voting at a polling station. The voting machine of the prior art does not comprise of a microphone and speakers for voice and audio input/output. In addition, the voting machine of the prior art is not connected to a trusted local, central or network server by wired or wireless methods for communication, computation, control and the accessing of various databases. The foregoing illustrates some of the prior art limitations of the voting machine and there are additional limitations not described in here.

Figure 2:
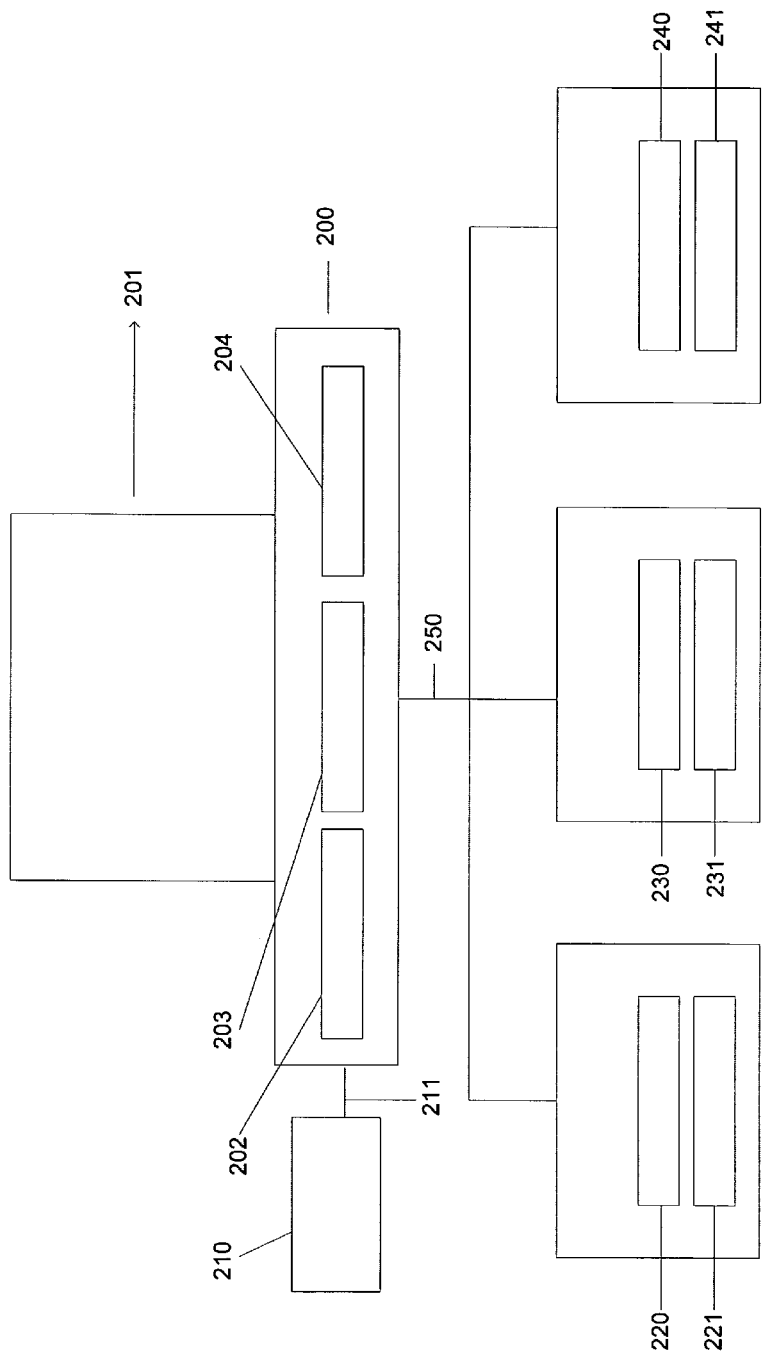
FIG. 2 is an embodiment of the present invention showing a touch screen enabled Intelligent Voting Machine, IVM, of the present invention that is networked with a local server, central and or network server.

Referring now to FIG. 2, the intelligent voting machine, IVM, 200 of the present invention comprises of a touch screen 201, for input/output and display, a hard disk drive 202 for storage of voting data within the voting machine, a removable magnetic/memory card, 203 for storage of voting data that is subsequently read by a separate computer, an activation card reader 204, for enabling the voter to activate the voting machine by a card issued to the voter at the polling station and a printer 210 that is either built in to the voting machine or is external to the voting machine for the purpose of providing a real time print out of the actual manner in which the voters has cast the votes and or for providing a valid receipt to the voter. The connection between the printer and the voting machine in the case wherein the printer is located external to the voting machine is by wired or wireless communication path, 211. In addition, the present invention provides a secure wired or wireless communication path 250, wherein the intelligent voting machine, IVM is able to interact with various levels of secure and trusted servers. As an example, the trusted local server 220 with its associated storage 221 may be located at the precinct level or other locations, the trusted central server, 230 with its associated storage 231 may be located at the county level and the network server, 240 with its associated storage 241 may be located at the state level. The elections generally are the responsibilities of the state and directly not that of the federal government. Consequently, another layer of trusted servers at the national level is not shown. However, any number of levels of trusted servers may be deployed said servers being connected to each other in a layered manner and or in parallel with ultimately each voting machine being connected to a server either directly or indirectly with appropriate firewalls gating the access. The intelligent voting machine, IVM, of the present invention is enabled to have a built in processor or no processor built in, with the ability to leverage the processing power of the built in processor by itself and or in conjunction with the processing power of the trusted local, central and network server to provide the desired and election authority approved functionality for enhanced utility to the voter.

Example 2.1: The IVM provides means for real time capture of one or more frames displayed on the touch screen, said frames representing the voter's final choices. The means for recording the frames may be by screen capture method, digitizing and or other methods. The voter is prompted by display or other methods that the data is being recorded as final and further prompted to receive a printout if desired. Since the printer is co-located in the voting booth, the voter is the only one that obtains the print out. To preclude the print out being left inadvertently in the printer with the potential for the print out of one voter being seen by the next voter, an audible alert is sounded by the printer within a set time interval and or upon the failure to remove the print out from the printer. Optionally, upon the failure to remove the print out by the voter within the designated time window, the printer is configured to advance the print out through a module that is part of the printer said module being capable of destroying the print out by shredding, erasing or other means. The present invention enables anonymity and at the same time provides a valid record of the voting to the voter in real time.

Example 2.2: The IVM of the present invention is connected to various trusted servers at the precinct level, county level and the state level by secure high speed wired or wireless means to provide redundancy of the storage of the valuable voting data and consequently, this system is not just dependent on the hard drive or the removable memory card associated with the particular voting machine. The tabulation of the results is in real time enabling the results to be announced very soon after the polls officially close. In the event of election challenges, there are a number of redundant sources of valid data that may be accessed in real time, such that speculation and doubts about the integrity of the election process are quickly put to rest. Timing is of the essence in elections and the present intelligent voting machine, IVM enables delayed or real time tabulation and announcement of the results.

Figure 3:
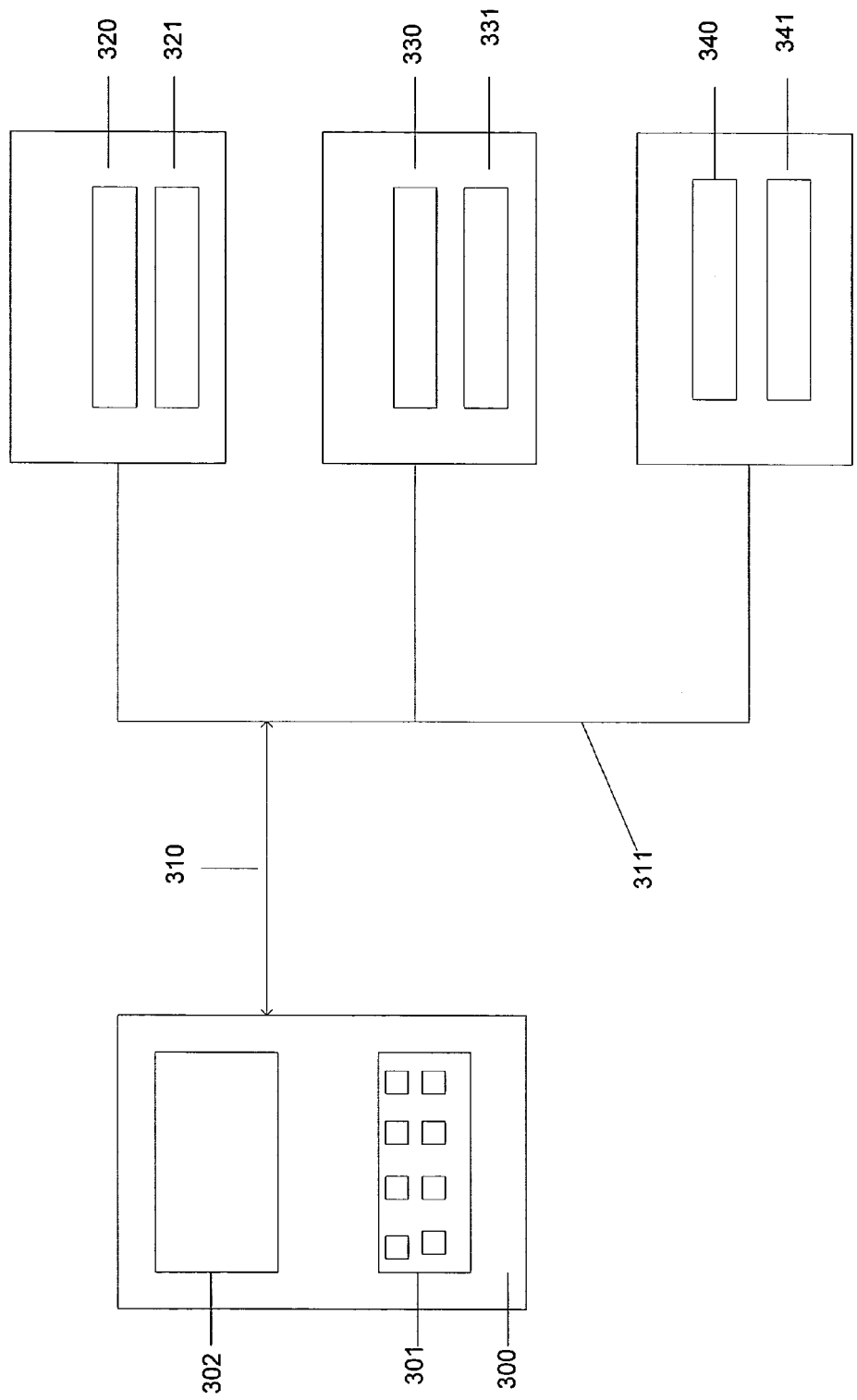
FIG. 3 is an embodiment of the present invention showing a touch screen enabled mobile device dynamically configured as a Mobile Voting Machine, MVM, forming a part of a wired or wireless network on which local, central and or network servers/storage exist.

Referring now to FIG. 3, the mobile communication device such as a cordless telephone, cellular telephone, Intelligent Protocol based IP phone, Wi-Fi phone, PDA and other multi function communication, computation and control devices are enabled in the present invention, to be configured as a mobile voting machine, MVM of the present invention. Alternately, the MVM is a standalone mobile voting machine designed specifically for executing electronic voting. The reference to MVM in the present invention is intended to include both the mobile device that is dynamically and temporarily configured for electronic voting and or a dedicated device designed specifically for mobile electronic voting purposes. The mobile device, acting as a MVM, is preferably touch screen input/output/display enabled for conforming to the official election body approved functions of an intelligent voting machine such that in this mode the mobile device emulates the approved and desired functions of an electronic voting machine. In certain cases the mobile device that is not touch screen enabled may with regulatory approval emulate the desired function of the electronic voting machine, by keyboard, voice or other input/output methods executed on the mobile device.

The present invention by extension and by inference extends to stationary devices or stationary voting machines, SVM, such as a personal computer but not limited to, the implementation of the desired and enabling features of the present invention with specific reference to the intelligent voting machine, IVM and the mobile voting machine, MVM for the purposes of electronic voting and other applications using the device by itself and or in conjunction with one or more trusted servers, escrow servers connected to the device by wired or wireless means. The examples with reference to an MVM generally extend to the SVM and are easily executable by those knowledgeable in the art on an SVM and are intended in this disclosure to be inclusive to the SVM.

With further reference to FIG. 3, the mobile communication device/mobile voting machine, MVM is represented by 300, the touch screen of the MVM is represented by 302 and the keyboard is represented by 301. The trusted local server 320 and its associated storage 321, the trusted central server 330 and its associated storage 331, the trusted network server 340 and its associated storage 341 are connected to the MVM 300 by the wired or wireless communication path 310. The trusted local, central and network server are connected to each other in a desired level of connectivity with the connection paths being isolated and not accessible by the mobile device/mobile voting machine 300. The intention is to isolate the communication path 310 from the internally secure path 320 for security reasons.

Example 3.1: The mobile device is dynamically transformed from standard communication, computation and control uses to the mobile voting machine, MVM configuration by utilizing the processing power of the mobile device by itself and or in conjunction with the processing power resident on one or more of the trusted servers which are accessed by wired or wireless means.

Example 3.2: The touch screen enabled mobile device is dynamically configured to emulate the functions of the approved electronic voting machine protocols by down loading the approved application related functional instructions from the trusted servers maintained by the election body which are made available upon registration and approval by the election commission and or the secretary of state or other approved agencies.

Example 3.3: The registered MVM 300, is enabled to access the voting information from the trusted election servers, 320, 330 and 340 and only upon valid personal registration during the approved time window, log-in and authentication upon log-in by the trusted servers by using one or more authentication schemes such as voter registration card number based, drivers license based, finger print based and other methods based. Voting information is made available during the approved voting period to ensure that the MVM is current on a real time basis.

Example 3.4: The registered voter is enabled in some cases to designate the specific mobile device intended to be configured or configured as a MVM. This feature of device based identity coupled with personal based identity enables an additional of authentication by the voter and the election authorities. The use of an additional level of device authentication in conjunction with the personal registration may be required or made optional to ensure secure voting by the registered voter and decrease the element of fraud and casting multiple votes. The mobile device identification is enabled to be static or dynamic IP based, Internet Protocol based identification using IPv4 or IPv6 methods, phone number based, and or other mobile device system identification based as deemed appropriate by the user and or the election authorities.

Example 3.5: The mobile device and or the voter as an individual are approved and enabled by the trusted servers to exercise the vote during the designated time frame as an absentee voter if the voter desires to do so and locked out from access to the trusted election servers before or after the designated time window.

Example 3.6: The voter as an individual using the approved mobile device, MVM are enabled to exercise the ability to vote on the designated election day by means of the mobile electronic voting method, beginning at the exact designated time when the polls open and precisely ending at the exact designated time when the polls close to enable the mobile electronic voting to be synchronized with the regular physical voting at a polling station. Any attempt to vote outside this window results in a lock out event requiring a reset by the trusted election servers.

Figure 4:
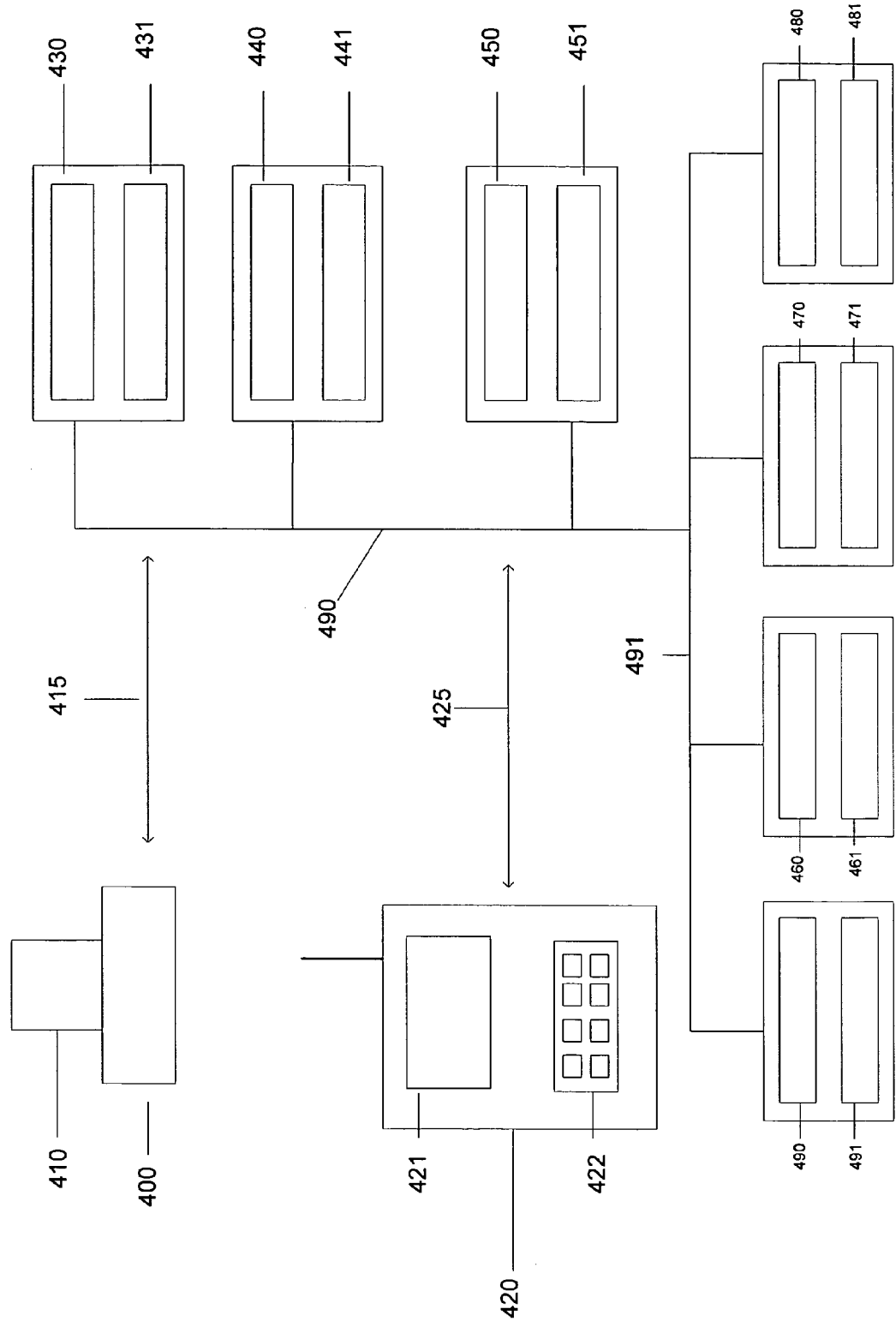
FIG. 4 is an embodiment of the present invention showing a means for redundant and secure servers/storage located locally and or in one or more remote locations, said servers/storage being connected by wired or wireless methods for secure communication; and working in conjunction with the Escrow Server, Trusted Servers, Intelligent Voting Machines, IVM and Mobile Voting Machines, MVM units over public and private networks.

Referring now to FIG. 4, the intelligent voting machine, IVM located at the polling stations is represented by 400 and the touch screen of the IVM by 410. The mobile device configured as a mobile voting machine, MVM is designated by 420, the MVM touch screen is designated by 421 and the keyboard of the MVM is shown as 422, and the wired or wireless communication path between the MVM 400 and the various trusted servers and their associated storage 430/431, 440/441 and 450/451 is shown by 425. The wired or wireless communication path between the IVM 400 and the trusted local server 430, the central server 440 and the networked server 450 and the associated storage of said servers, 431, 441 and 451 is shown by 415.

Example 4.1: Means for achieving layered security and isolation of servers.

Additionally, the trusted servers and their associated storage devices 430/431, 440/441 and 450/451 are connected by wired or wireless means to various levels of remotely located and secure servers and their associated storage and the storage databases, 460/461, 470/471, 480/481 and also to the escrow server 490 and its storage 491 by one or more secure and dedicated high speed communication lines shown by 491. The remotely located servers 460, 470 and 480 are enabled to be connected to the remote servers and the escrow server by the secure dedicated line 491 whereas the communication path between the servers 430, 440 and 450 is by the secure communication path 490. Neither, the communication path 490 or the communication path 491 can be accessed by the IVM 400 or the MVM 420 or by any other unauthorized individuals, entities or communication devices. The trusted servers 430, 440 and 450 are enabled for access by the MVM by communication path 425. Further the election body may limit the access to the servers 430, 440 and 450 singly or in combination and maintain another level of corresponding proxy servers that may be accessed by outside mobile voting machines or inside intelligent voting machines. Any access to these real servers or the corresponding proxy servers 430, 440 and 450 is enabled by means of an approved communication device that is specifically configured as a MVM, such access and authorization, the timing and duration of the access determined by security considerations to achieve layered security and isolation of one or more of the servers, said security and access protocols solely determined by the election authorities.

Example 4.2: An additional level of security and real time redundancy is achieved by means of the IVM that is network connected to one or more trusted servers wherein the data on the IVM is swept real time to one or more trusted servers and the storage that is associated with said trusted servers. In the prior art the redundancy level is very low and at best the redundancy resides in the hard drive of the voting machine and the memory card with the potential for the loss of data during a short or long period due to acts of nature such as fires, floods, earthquakes, terrorist attacks and other catastrophic events. The potential for an unforeseen disastrous event is acute in the world today and the probability of an event happening during the election period at one or more locations is not trivial statistically. In the event of such a terrible and tragic event the final results of an election could be skewed in an undesirable and unforeseen manner. Therefore the homeland and other security considerations warrant the real time and dynamic capture of the polling data from every location with the periodicity/frequency of the data sweep from the individual IVM units and the servers being determined by cost, data integrity and security considerations. The present invention enables the means for periodic data sweep from an individual IVM unit or a group of IVM units located at a polling station to a trusted local server; and the periodic data sweep from the trusted and secure local server to a trusted and secure central server, and the periodic data sweep from the central server to a trusted and secure network server. The data sweep and storage of the valuable data in appropriate databases in the storage devices associated with the trusted servers is enabled to be executed sequentially or in parallel to the desired servers/storage, located in one or more geographical locations such as at remote and trusted servers and storage devices 460/461, 470/471, 480/481 and the escrow server 490/491; and over one or more of the desired and secure communication lines either in a sequentially manner or in parallel manner, at the desired time or in the desired time window and or in a random manner, and at the desired periodicity/sweep frequency using the best available encryption algorithms and data compression technologies.

Example 4.3: The Escrow server, 490 and the associated storage device 481 are updated with polling data from all the distributed IVM machines and the mobile voting machines, MVM units on a real time basis and are in the control of the election commission with a high level of access control under the watchful purview of the judiciary and the public as needed. The data is time stamped. The escrow server is intended to perform the function of an information repository that is un-impeachable for its integrity and accuracy.

Figure 5:
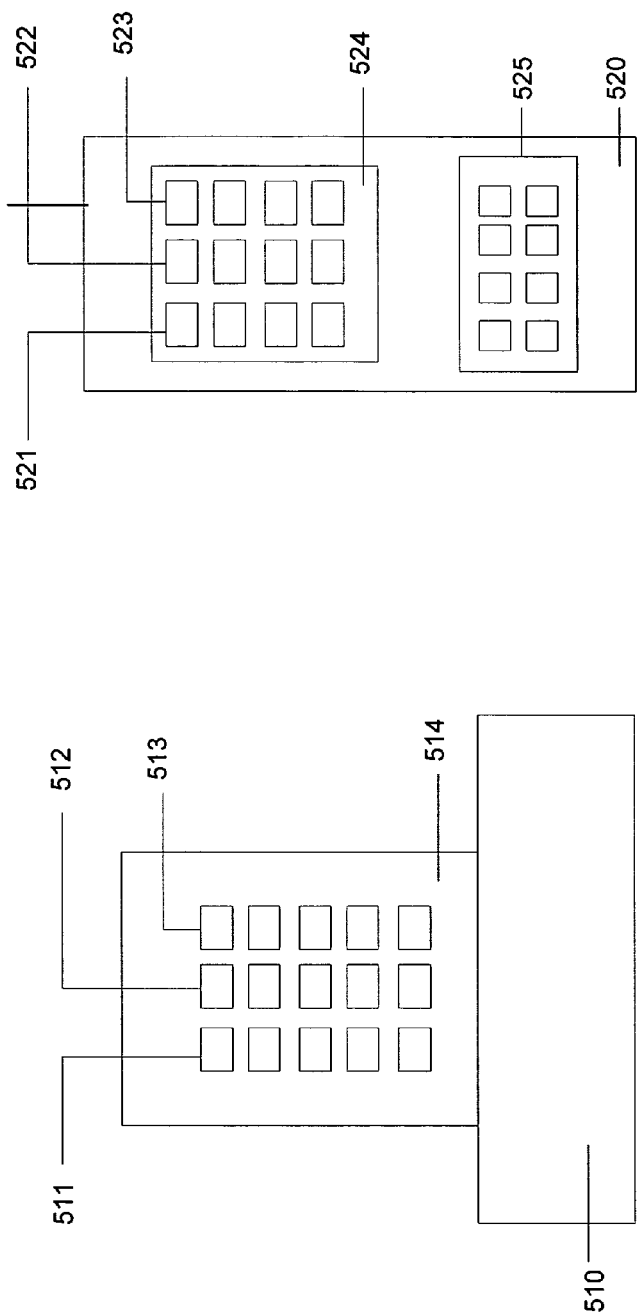
FIG. 5 is an embodiment of the present invention showing a means for voters who have acceptable vision but who do not know how to read and or write, to exercise their voting privileges by means of symbols and images and photos that represent the different candidates and the different issues.

Referring now to FIG. 5, in another embodiment of the present invention the electronic voting by illiterate voters who are reading and writing impaired is enabled by providing a means for symbol driven selection of the different candidates and different issues. Symbols are readily recognizable and represent an efficient means of selection. In a number of developing countries the literacy rate is very low while the intelligence of the electorate is very high. The voters are well informed and capable of making independent assessments on the candidates and issues. Consequently, of the most efficient methods is to enable symbol driven voting.

The IVM of the present invention is represented by 510, with the IVM having a touch screen enabled input/output capability 514. In the touch screen window a choice is provided to the voter for selecting the symbol driven election method by symbol, voice or audible prompt. Upon selection of the symbol driven voting method, the touch screen of the IVM is enabled for display of the various candidates and the different issues with each candidate and each issue being uniquely represented by an associated symbol. As an example, the row 511 represents the candidates and the issues in some defined order that require a choice. The row 512 represents the action representing YES choice and the row 513 represents the NO choice. The selections are executed by touching the appropriate actions associated with each symbol and selecting the symbol associated with the YES action and the symbol associated with the NO action. The foregoing is a representation for illustration purposes of a simple symbol driven method and is not intended to be exhaustive.

In a similar manner, the mobile device acting as MVM 520 is configured with keyboard 525 and touch screen 524. Upon selection of the symbol driven voting method touch screen of the MVM is enabled for display of the various candidates and the different issues with each candidate and each issue being uniquely represented by an associated symbol. The row 521 represents the candidates and the issues in some defined order that require a choice. The row 522 represents the action representing YES choice and the row 523 represents the NO choice. The selections are executed by touching the appropriate actions associated with each symbol and selecting the symbol associated with the YES action and the symbol associated with the NO action. The foregoing is a representation for illustration purposes of a simple symbol driven voting method and is not intended to be exhaustive. In addition the features for up, down, next, back and other actions are also represented by readily understood symbols or icons.

Example 5.1: The candidate is enabled to choose a symbol to uniquely represent the candidate and register the selected symbol with the election body. By this means the voters are aware of the unique association of the candidate with a specific symbol.

Example 5.2: The party is associated with a unique symbol, such as the Democratic party being represented by a donkey symbol and the Republican party by an elephant symbol.

Example 5.3: The selection of a YES action on an issue may be enabled by the symbol of a fruit, say the mango and the fruit lemon for NO action.

Example 5.4: In a similar manner the issues on the ballot are represented by unique symbols. As an example a proposition that is for development and growth is enabled for representation as a tree in that is sprouting new leaves.

Example 5.5: The symbol driven voting menus are controlled by the election body. The symbol driven voting method is enabled on the IVM and the MVM by down loading the appropriate screens in a dynamic manner from the election servers at the desired time. The actions and selections of the voter using the symbol driven voting method by means of the IVM or the MVM are uploaded to the election servers.

Example 5.6: Alternately, the user is enabled to assign different symbols of the voter's choice to a candidate, an issue and the YES and NO actions. This option provides customization that best suits the voter. In this mode the election body need not assign any symbols. However, the voter with the help of a trusted organization configures a look up table wherein the standard textual choices are uniquely associated with customized symbols of the user's choice. The customized symbols and their one to one correspondence to a particular candidate, an issue and the YES/NO actions is uploaded to the election servers and stored for use at the appropriate time by the voter during the election and voting. As an example, the voter has the ability to assign the pig symbol to a candidate in the voter's customized election menu and the symbol angel to another candidate that is preferred. The IVM and MVM are enabled to down load the voter's symbol driven election menu when casting the votes and the voter's symbol driven selections and actions relative to a candidate or an issue are uploaded at the time of casting the ballot.

The foregoing examples illustrate the means for symbol driven electronic voting by one or more methods enabling the IVM and the MVM to dynamically perform the symbol driven voting actions by preset definition of the symbols by the election authorities and or personalization of the symbols by the voter; and using the processing power of the IVM and the MVM in a stand alone manner and or using the processing power of the local, central and or network servers; and means for secure wired or wireless communication.

Figure 6:
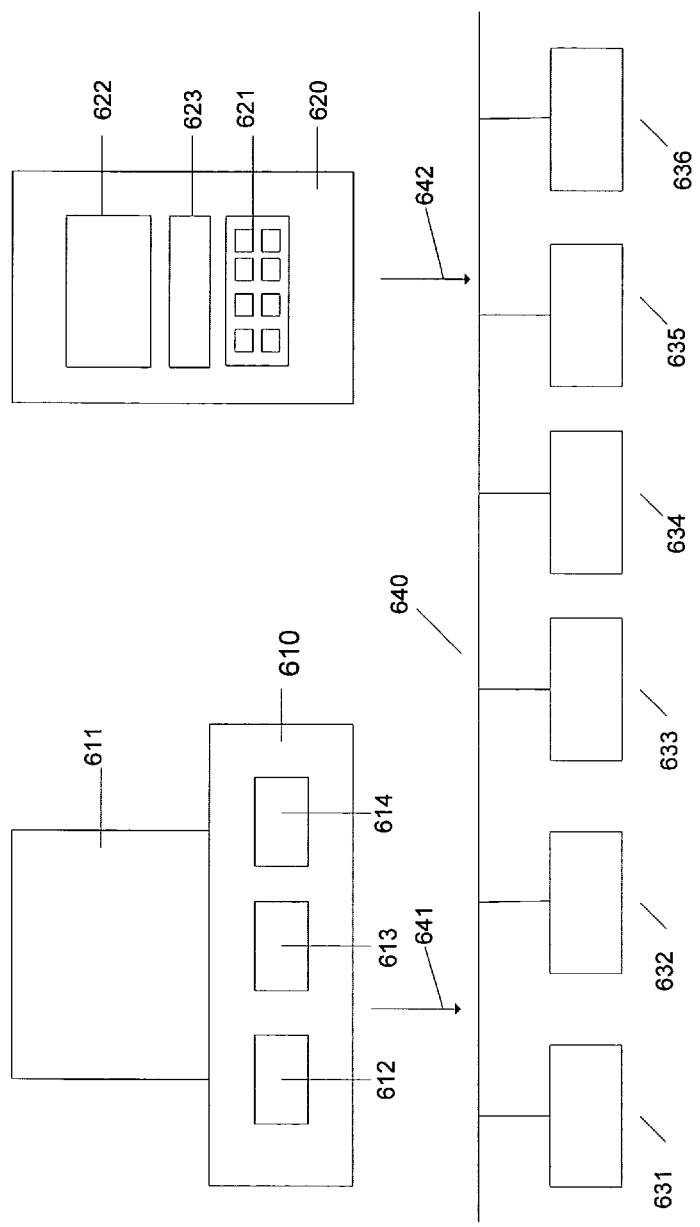
FIG. 6 is an embodiment of the present invention showing a means for voice input/output in one or more languages to enable language impaired voters to cast their votes. Additionally includes a trusted time keeping server and a trusted GPS server for location determination of the mobile voter.

Referring now to FIG. 6, in yet another embodiment of the present invention, the intelligent voting machine, IVM 610, is enabled for configuration with one or more internal features and or external attachments for enhanced utility. The voting machine of the prior art is not configure with a microphone and speaker. The IVM 610 is configured with a microphone 612 for voice/audio input, a speaker 613 for voice/audio output, and an illustrative box 614 to represent other internal or external features and attachments such as finger print reader, retinal scan reader and others. Similarly the mobile voting machine, MVM 620 of the present invention is enabled for configuration by internal hardware/software features and or external hardware attachments to deliver enhanced functionality and electronic voting capabilities in a stand alone manner using the processing capabilities of the IVM/MVM and or in conjunction with the processing power and database capabilities of the appropriate local, central and or network servers, such capabilities being represented in the figure by the box 623 for illustrative purposes. The keyboard of the MVM is represented by 621 and the touch screen input/output/display by 622.

Additionally, the IVM and the MVM are enabled to connect by wired or wireless means to one or more of the trusted servers as appropriate, such as the trusted Language Translation Server 631, the trusted local server 632, the trusted central server 633, the trusted network server 634, the trusted GPS server 635, the trusted time keeping server 636 and the trusted escrow server 637 to achieve the desired functionality by acting alone and or in tandem. Each server is enabled with an associated storage and databases which are not shown since the concept has been shown in prior figures. The communication path, 641 between the IVM and the trusted servers is generally under the supervision and control of the election body. However, this path is isolated from the separate internal communication path between the trusted servers. The communication path between the mobile device/mobile voting machine and the trusted servers is shown as 642, which path is isolated from communication path 641 and 640 for a high level of security.

Example 6.1: Language translation of the text and voice/speech is enabled by using the processing power of the IVM/MVM by itself and or the language translation server 631 to dynamically enable the electronic voting in one or more languages without the election authorities printing ballots in multiple languages at great expense. Thus the feature of language translation is of great utility in multilingual/multi dialect countries such as India, China, USA and others to enable casting of the votes by voice inputs in one or more languages.

Example 6.2: Yet other embodiments of the present invention also enable the conversion of speech to text and text to speech in one or more languages with the IVM/MVM acting alone and or leveraging the processing/database capabilities of the appropriate trusted server for accurate and trusted conversions in real time. The text to speech and speech to text conversions are of great utility to vision impaired voters and also language impaired voters.

Example 6.3: The configuration of the IVM of the present art with a microphone and speaker provides the voter with the needed interface. In the case of the MVM, which is a mobile communication device in its original configuration, the microphone and speaker are already available.

Example 6.4: In another embodiment of the present invention, the ability for handwriting-recognition in one or more languages is enabled by using the processing power of the IVM/MVM in a stand alone manner and or in conjunction with one or more trusted servers. An example of the utility of handwriting recognition is the capability for voting for a Write-in-Candidate by simply writing on the touch screen with a pen or stylus the name of the candidate that is not on the ballot. In addition the companion utility is that of Signature recognition and authentication of the voter by the trusted server.

Example 6.5: In another embodiment of the present invention, the authentication of the voter by finger print means is enabled by using the touch screen or a special built in or external attachment for the accurate acquisition of the finger print in real time and the comparison of the acquired finger print with the finger print records in the voter database resident on the trusted servers to authenticate the voter as eligible by using the processing power of the IVM/MVM and or the trusted server.

Example 6.6: In another embodiment of the present invention, the authentication of the voter by retinal print means is enabled by using a special built in or external attachment for the accurate acquisition of the retinal print in real time and the comparison of the acquired retinal print with the retinal print records in the voter database resident on the trusted servers to authenticate the voter as eligible by using the processing power of the IVM/MVM and or the trusted server.

Example 6.7: In another embodiment of the present invention, the authentication of the voter by voice print means is enabled by using a special built in microphone or external attachment for the accurate acquisition of the voice print in real time and the comparison of the acquired voice print with the voice print records in the voter database resident on the trusted servers to authenticate the voter as eligible by using the processing power of the IVM/MVM and or the trusted server.

Example 6.8: In another embodiment of the present invention, the authentication of the voter by photo/image print acquisition means is enabled by using a special built in camera or external attachment for the accurate acquisition of the photo/image print in real time and the comparison of the acquired digitized photo/image print with the photo/image print records in the voter database resident on the trusted servers to authenticate the voter as eligible by using the processing power of the IVM/MVM and or the trusted server.

Example 6.9: In yet another embodiment of the present invention the IVM and MVM units are provided with an optional Braille enabled keyboard in conjunction with the touch screen input/output/display, and the microphone/speaker features to assist the vision impaired voter to use the voice enabled voting method and or the Braille keyboard enabled voting method.

Example 6.10: In yet another embodiment of the present invention, the time stamping of the actual time at which the voter cast the ballot is enabled in conjunction with a trusted time keeping server. The trusted time keeping server, 636 of the election body is synchronized with a time keeping server maintained by a standards body which maintains the most accurate time by atomic clock and other methods. There is a need for uniformity with respect to the precise time at which the polls open and the polls close in all precincts and counties across a state and in national elections across all states. In addition the duration for which the polls stay open is also relevant. The ability for small differences in time keeping across various precincts, counties and states presents the potential for lack of uniformity and fairness in elections. This problem is solved in the present invention by having the IVM/MVM and the trusted servers synchronized or alerted such that voters have a better knowledge of the accurate time at which polls open and polls close and the elapsed duration for each precinct. Voting by the highly mobile electorate is likely across various time zones while the voter is only authorized to participate in elections in a geographical area such as a designated, city, municipality, county or a state. Thus the voter on the move must have the ability to exercise the right to vote in conformance with the local regulations. The trusted servers are enabled to cause a lock out event for any attempt to vote outside the designated time based parameters.

Example 6.11: In yet another embodiment of the present invention, at times the physical location of the highly mobile voter is relevant. Certain countries and election authorities require by law that the voter be present physically within their geographical boundaries. In order to facilitate voting by the MVM method it is therefore necessary to authenticate the physical location of the voter at a given time. The present invention uses a trusted GPS, global positioning server that works in tandem with the trusted servers of the election body. The MVM contacts the election trusted servers, said servers initiate a GPS tracking of the MVM unit and determine its location which is checked and validated by the trusted GPS server and the trusted election servers working in tandem; and further authenticated for time and place and then enabling the MVM and the voter to cast the ballot upon approval. These location determining, time determining and other authentication and enabling actions are performed by the MVM device and the trusted servers acting in tandem or in a sequential manner by means of wired or wireless secure connectivity.

The present invention enables the appropriate functions for the dynamic provision of the utility desired by the voter based on one or more disabilities/infirmities/special circumstances while ensuring a high degree of authentication of the voter by using one or more of the features used singly and or in combination and by leveraging the capabilities of the IVM/MVM units and the trusted servers acting singly and or in combination.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. A secure system for electronic voting, comprising:
  a) an intelligent voting machine configured for communication, computation, command and control of information including one or more of audio, video, images, photos, graphics, text, speech, voice, data and information;
    wherein said intelligent voting machine is hardware configured for operation in conjunction with one or more types of inputs including one or more of a keyboard input, a touch screen input, a voice input, audible inputs, data inputs and biometric inputs; and
    wherein said intelligent voting machine includes hardware configured for operation in conjunction with one or more types of outputs including one or more of a keyboard output, a touch screen output/display, text output, image output, photo output, graphics output, video output, a voice output, audible outputs, and data output;

wherein said intelligent voting machine includes internal processing, storage, database, authorized software and application capabilities;

b) one or more trusted servers with associated storage devices including a local server with an associated storage device, a central server with an associated storage device, a network server with an associated storage device;

c) means for secure wired or wireless real time communication between the intelligent voting machine and the local server and other trusted servers/storage devices that are one or more of co-located and remotely located, means for locating the intelligent voting machines in polling booths, at polling stations and at selected locations, means for secure real time communication between one or more intelligent voting machines and the local trusted server, means for secure real time communication between the trusted local server/storage devices and other trusted servers located remotely from the polling booths/stations by secure communication links;

d) means for utilizing the processing power, databases, data, software and applications of the intelligent voting machine in conjunction with the processing power, databases, data, software and applications of the trusted local server or in combination with the processing power, databases, data, software and applications of a remotely located trusted central server, a remotely located trusted network server and other local/remotely located trusted servers;

e) means for defining an authorized set of voter authentication protocols, means for secure real time authentication of a voter in conjunction with the authentication data related to the voter maintained on an independent and trusted escrow server including authentication while assuring anonymity of the voter, means for providing authenticated and consistent information related to election issues, candidates and other matters from an approved source such as a trusted server in one or more selected formats including one or more of text, image, graphics, audio, video, and data formats;

f) means for informed selection and casting of votes by the voter in conjunction with one or more of a user selected input method and a system defined input method and one or more of a user selected output method and a system defined output method, means for recording the selection of the voter in real time within the intelligent voting machine, within a local server, within one or more trusted and escrow servers, g) means for tracking, counting and tabulating election results in real time within the intelligent voting machine, the local server, and one or more trusted/escrow servers, including means for counting and tabulating the election results without identifying a particular voting machine or polling station, means for utilizing a plurality of intelligent voting machines, sequentially/concurrently/in selected order for secure electronic voting at a selected time and within a selected time period by one or more voters, means for safe guarding, certifying and providing the election results at a selected time and in a selected manner in conjunction with one or more trusted escrow servers.

2. An intelligent voting machine for secure electronic voting, comprising:

a) a touch screen enabled input/output and display,
a built in processor,
an internal hard disk storage,
a removable memory storage,
an activation mechanism for activation of the voting machine by one or more of a card activation method, password method, and one or more methods that relate to biometrics of a specific voter,
a print capability enabled by built-in means or external means,
a secure wired or wireless communication capability with a secure path for communication between the intelligent voting machine, a local server and the secure printer;

b) means for the voter to initiate and terminate the print action,
means for the voter to obtain a secure print out of a ballot as cast by the voter,
means for the secure print out being a true representation of the ballot as cast by the voter,
means for stamping of the print out by voter registration number or other methods wherein the specific voter is identified or the identity of the specific voter is masked, including means for time stamping and location stamping of a polling station on the print out,
means for the secure printer to provide an alert to the voter to take the printout upon failure by the voter to take the print out;

c) means for secure destruction of the print out related to a previous first voter, in the event the print out is not taken by the first voter;
means for one or more of shielding and destruction of the print out of the first voter to prevent compromise of the print out by a next subsequent voter;

d) means for a secure wired or wireless connection between the intelligent voting machine and one or more trusted/escrow servers including a local, central and network servers for authentication of the voter and approved election information;
means for leveraging the processing power, storage, databases, software and applications resident within one or more of the intelligent voting machine and the processing power, storage, databases, software and applications resident within one or more of the trusted servers;
means for secure selection/casting of the votes by the voter in conjunction with a secure paper record of said votes as cast by the voter;
means for real time recording of the votes within the intelligent voting machine and one or more of a trusted local server, a trusted central server, and a trusted network server.

3. A secure system for mobile electronic voting, comprising:

a mobile device, including one or more of a cellular telephone, personal digital assistant PDA, a laptop computer and mobile devices, the mobile device configured for communication, computation, command and control, wherein said mobile device is configured for one or more types of input/output methods including one or more of voice, audio, speech, text, data, display, touch screen input/display, and keyboard methods;

one or more trusted servers with associated storage devices, including a trusted local server, a trusted central server and a trusted network server;

means for dynamically configuring the mobile device as a mobile voting machine in a standalone manner using an application hosted on said mobile device or in conjunction with the software available from/resident on an authorized trusted server, means for secure wired or wireless communication between the mobile device and the trusted servers/storage;

means for dynamic reconfiguration of the mobile device in a stand alone manner or in conjunction with the trusted servers to the original non mobile voting machine configuration upon conclusion of the mobile electronic voting;

means for controlling the mobile device as a mobile voting machine under processors of one or more of the mobile device and one or more of the trusted local, central and network servers;

means for a unique electronic key to be assigned by the trusted election server to the mobile device of an eligible voter;

means for activating the electronic key at a precise local date and time of an election precinct at a start of an absentee voting period and means for deactivating the electronic voting key at the precise date and local time of the election precinct at a conclusion of the absentee voting period;

means for activating the electronic key at a precise local date and time of an election precinct when polls open for voting and means for deactivating the electronic voting key at the precise date and local time of the election precinct when the polls close; and means for enabling/disabling the mobile electronic voting privileges to ensure that a specifically authorized voter casts votes in accordance with election laws of the selected region using an authorized mobile device.

4. A secure system for mobile electronic voting of claim 3, comprising:

a) means for uniquely identifying the mobile device by one or more of IPv6 identification number, EIN number, and telephone number for the purpose of authenticating the mobile device for a selected mobile electronic voting activity;

b) means for using one or more legally approved voter profiles for authentication purposes, wherein the specific individual exercising the mobile electronic voting privileges is authenticated in accordance with laws related to said mobile electronic voting in a selected voting region, means for authentication of the specific voter by comparison of the data related to that specific voter maintained in databases/lookup tables of one or more trusted/escrow servers, including means for comparison in conjunction with the data bases/lookup tables resident on the mobile device;

c) means for online registration with a trusted election server of the mobile device by device identification method, means for online registration of a specific individual as a voter within a voting region with a specific and unique voter profile, means for the voter profile to indicate party affiliation and or independent status, means for eligibility of the voter to be determined by a registrar of voters or other authorized bodies.

5. A secure system for mobile electronic voting of claim 3, comprising:

means for location determination of the mobile device by a trusted GPS server means, means of wired or wireless communication with the GPS server and one or more trusted servers, means for the precise determination of the physical location of the voter and the mobile device, means for determination of the eligibility of a voter based on presumed/actual location of the voter in conjunction with the designated/approved mobile device;

means for enabling/disabling the mobile electronic voting privileges of a mobile device and a voter;

including means for enabling/disabling of the mobile device based on presumed/actual physical location and the relationship of the presumed/actual physical location to the designated voting precinct location in the event laws mandate a physical presence with a precinct/region.

6. A secure system for mobile electronic voting of claim 3, comprising:

means for time determination of the mobile device by a trusted time keeping server, means of wired or wireless communication with the trusted time keeping server and other trusted servers;

means for the precise determination of the physical location and time of one or more of the voter and mobile device, means for determination of the eligibility of the voter in conjunction with the designated/approved mobile device based on presumed/actual location and time, means for enabling/disabling the mobile electronic key and the voting privileges by time based factors including means for enabling/disabling of the mobile device based on the time at presumed/actual physical location and the relationship of the time at presumed/actual physical location to the time at the designated voting precinct location.

7. A secure system for mobile electronic voting of claim 3, comprising:

means for precinct level time stamping the mobile electronic voting wherein the mobile electronic voting actions/activity related to a voter and a corresponding mobile device is recorded within one or more trusted servers and the mobile device, means for time stamping based on the time relative to the presumed/actual physical location of one or more of the voter and mobile device where said time determination and location determination are enabled by a trusted time keeping server and a trusted location determining GPS server respectively, means for time stamping either or both of the times where the mobile device is located and the time at the central precinct level.

8. A secure system for mobile electronic voting of claim 3, comprising:

means for precinct level location stamping of the mobile electronic voting actions/activities of a voter by a trusted server, means for location stamping based on physical location of one or more of the voter and mobile device, by a trusted server, means for voter identity stamping by a trusted server, means for ensuring that duplication of voting by the same individual and other unauthorized actions are precluded and a complete record tracking the detailed actions/activities of a voter and the associated mobile device is maintained on one or more trusted servers.

9. A secure system for mobile electronic voting of claim 3, comprising:

means for precinct level location stamping of the mobile electronic voting by a trusted server, means for location stamping based on physical location of the voter and mobile device by a trusted server, means for voter identity stamping by a trusted server, means for acquiring the ballot data displayed on the touch screen of the mobile device frame by frame or all of the frames for print out and storage purposes;

means for real time provision of an electronic validated receipt by the trusted election server to the mobile device and or to another stationary device, means for enabling a print out and or storage of the actual ballot cast by the voter in conjunction with the trusted official election server and the processing/storage capabilities of the mobile device for printing concurrently, for printing in conjunction with a local or remote printer and for storage and printing at a selected time, means for ensuring that the voter has a complete validated and certified record tracking detailed actions of said voter and the associated mobile device hosted at the mobile device or available from on one or more trusted servers concurrently or at a selected time wherein said records are enabled in print form, in an electronic record form or one or more forms for use at a selected time.

10. A secure system for mobile electronic voting of claim 3, comprising:

means for high speed wired or wireless communication between the mobile device and one or more of the trusted servers, including one or more public/dedicated wired or wireless communication paths, means for the mobile device to communicate for the purpose of mobile electronic voting, using a selected/assigned encryption/decryption protocol in conjunction with a trusted server, means for the trusted server to randomly enable one or more encryption/decryption algorithms/protocols specific to a selected mobile device to limit discovery and intrusion, including means for said encryption/decryption protocols/algorithms to be variable in time for limiting discovery/intrusion, and means for encrypted and secure communication of voting actions and voting data on one or more public/dedicated wired and wireless communication channels of the mobile device.

11. An apparatus for mobile electronic voting, comprising:

a mobile voting machine configured for mobile electronic voting, the mobile voting machine including one or more of a mobile device, a cellular telephone, PDA, laptop computer configured for performing mobile electronic voting, the mobile voting machine including:

a processor hosting at least one application;

one or more input/output methods that include one or more of a touch screen, a display, a keyboard, a speaker and a microphone, means for communication of voice and data by wired or wireless methods, means for the mobile device to emulate the functions/features of the mobile voting machine by internal reconfiguration, means for reconfiguration of the mobile device as a mobile voting machine in conjunction with a remote server, means for defining an authorized set of voter authentication protocols, means for secure real time authentication of a voter in conjunction with the voter authentication protocols, wherein the voter authentication protocols are maintained on the remote server, means for providing at the mobile voting machine authenticated and consistent information related to election issues and candidates in one or more selected formats including one or more of text, audio, video, and data formats, means for receiving via the mobile voting machine a vote cast by the voter, means for recording the vote in real time at one or more of the mobile voting machine and the remote server.

12. A secure and comprehensive stationary and mobile electronic voting system, comprising:

a) a separate and distinct sub system comprising intelligent voting machines located at polling stations, means for high speed wired or wireless communication between the intelligent voting machine and one or more trusted local, central and network servers, means for using processing power/databases/software of the intelligent voting machine by itself or in conjunction with the processing power/databases/software of the trusted local, central and or network servers;

b) a separate and distinct sub system comprising at least one mobile device configured as mobile voting machines for voting from any location, means for high speed wired or wireless communication between the mobile device and one or more trusted local, central and network servers, means for using the processing power/databases/software of the mobile device by itself or in conjunction with the processing power/databases/software of the trusted local, central and or network servers;

c) means for an authorized election body to use/deploy the two separate and distinct sub systems, namely the intelligent voting machines system and or the mobile device system in a standalone manner or in combination enabling the voters a choice to vote at a polling station using an intelligent voting machine or from any location using their mobile device, d) means for maintaining confidentiality of a ballot cast by a specific voter using one or more methods, including dynamically decoupling voter ID, biometrics and other voter information and its relationship to the ballot cast by that specific voter upon initiation of a selections process and cast ballot function, maintaining the voter ID and voter related information on a separate trusted escrow server, wherein said trusted escrow server provides independently validated voting credentials/certificate in real time to the mobile device, and providing a corresponding validated voting credentials/ voting certificate in real time, stripped of an actual identity of the voter in said information, maintaining secrecy of the ballot as cast by a specific voter, means for delivery of uniform, timely, secure, secret, anonymous and convenient voting services to the voters in accordance with local, state and federal laws governing each election.

13. A secure electronic voting system of claim 12, comprising means for eliminating disparities relative to information and time between an absentee ballot voter and a voter casting a ballot on the election day at a polling station, wherein the absentee ballot voter is provided with a deadline for casting the vote that is equivalent to the deadline provided to the voter casting the ballot at the polling station.

14. A secure system for electronic voting of claim 12, comprising:

means for authentication of the voter in conjunction with a specific type of machine being used such as the intelligent voting machine or the mobile device, means for executing one or more authentication tasks in a stand alone manner by utilizing the processing power/databases/software resident within the intelligent voting machine/mobile device or in conjunction with the processing power/databases/software of one or more of the trusted local, central and or network servers;

means for using one or more levels of authentication of the voter as appropriate for the intelligent voting machine or the mobile device, means for authentication by photographic method, drivers license, passport, birth certificate, social security number, identity card number, video, audio, voice print, finger print, digital signature, hand writing recognition, signature recognition, voting machine ID number and other methods;

means for using one or more identification methods for determining voter and or voting machine identity singly and or in selected combination as appropriate for each sub system, in conformance with election laws.

15. A secure system for electronic voting of claim 12, comprising:

means for enabling real time access to approved and trusted information one or more of before and during the activity of casting the ballot by means of the intelligent voting machine or the mobile device, means for providing the authorized real time information to the voting machine by secure wired or wireless communication with a trusted local, central, network server, escrow server, time keeping server, GPS server;

means for the appropriate information to be displayed or presented on a desired device using a desired interface at a desired time in one or more windows within a display, means for the voter to view the information in one or more windows for comparison and decision analysis on candidates and issues, means for information to include candidate profiles, photos, video, audio, and positions on the issues and other information, means for selection of the desired input/output and display method on the intelligent voting machine or the mobile device, means for the information request/delivery, the ballot selections, actuations, and casting of the ballot by full function keyboard, partial function keyboard, special function keyboard, macro functions, touch screen, voice, audio, sound, text, image, photo, symbol driven, object driven, icon driven, braille and other methods;

means for configuring the intelligent voting machine or the mobile device interface, input, output and display functions in a standalone manner by using one or more of processing power/databases of the intelligent voting machine and the mobile device and the trusted local, central and or network servers, means for informed real time decision, selection and casting of the ballot by the voter at the time and using the voting machine.

16. A secure system for electronic voting of claim 15, comprising:

means for real time text to speech and speech to text conversion, means for voice input and output in one or more languages, means for language translation of text and speech from a first language to one or more second languages;

means for the appropriate text to speech, speech to text and language translations/conversions by using the processing power/databases/software of one or more of the intelligent voting machine of the mobile device or the trusted local, central and or network servers;

means for ballot selection and casting of the ballot in one or more languages.

17. A secure system for electronic voting of claim 15, comprising:

means for a trusted second individual to assist a first individual who is an eligible voter, means for validating the eligibility of the first individual and provisionally enabling the first individual, means for acquisition of an identity and signature of a second individual in a touch screen window or by other input and authentication means in conjunction with one or more of the selected voting machine and the trusted local, central and or network server, means for the authentication and approval of the second individual to act in a fiduciary capacity with specific power of attorney privileges for the first individual voter, means for the second individual to determine the ballot choices of the first individual by the appropriate methods, means for the second individual to cast the ballot as a proxy for the first individual;

means for a third individual and or additional witnesses to be authenticated and approved by trusted servers to act as a witness or witnesses, means for witnessing and authenticating by one or more witnesses to ensure that the second individual is performing the actions intended by the first individual voter.

18. A secure system for electronic voting of claim 17, comprising:

means for the second individual to remotely perform actions desired by the first individual using a stationary or mobile device, means for the first individual to remotely monitor and review by appropriate and desired interface, input and output method, the actions of the second individual;

means for the first individual and the third individual acting as a witness, to remotely monitor and review by appropriate choice of the desired interface, input and output means the real time actions of the second individual;

means for wired or wireless connectivity and collaboration between the first individual, second individual, third individual and other individuals, the stationary devices in use, the intelligent voting machines in use, the mobile device/mobile voting machine in use and the trusted servers, means for a disabled voter to cast a vote using one or more of remote, contemporaneous, designated time, and delayed collaboration among one or more of the communication devices, voting machines and the servers.

19. A secure system for electronic voting of claim 15, comprising:

means for a disabled voter to select the desired input/output/display and interface that is of assistance to overcome a disability, means for the disabled voter to be adequately informed using one or more selected input/output interfaces, means for the disabled voter to cast the ballot in a desired manner and at the desired time within the approved election period or at the polling station, means for the disabled voter to receive a receipt about the ballot as cast by the disabled voter said receipt being in the manner that is most useful to the disabled voter.

20. A secure system for electronic voting of claim 12, comprising:

means for tracking the actions of the specific voter and the voting machines used by the voter in real time, means for detecting the actions of multiple voting by the same individual on behalf of the voter and or on behalf of other voters, means for locking out a particular voter or the particular intelligent voting machine or the mobile device from accessing the trusted election servers, means for fraud detection, determining fraud trends, isolating fraud prone machines, fraud prone precincts and providing alerts in real time for action by law enforcement authorities, means for providing a trail of the fraudulent activity for review and correction of any voting discrepancies by authorized election body and judicial officials.

21. A secure system for electronic voting of claim 12, comprising:

means for providing one or more layers of security for conducting elections in a fair and transparent manner, means for locking in selected functionality and locking out selected functionality of the trusted election servers by a function-lock and time-lock feature, means for automatically initiating the function-lock and time-lock features at the desired time on one or more of the selected secure and trusted servers and terminating the function-lock or time-lock automatically after a set time period duration or at a set time, means for limiting the access, alteration of the functions and other features during the function-lock and time-lock sequence, means for override of the function-lock and the time-lock features by authorized override procedure obtained by judicial orders or other official directives, means for the prevention of premature release of the polling data and the coordinated release of certified results at the desired locations, at the desired time and in the desired sequence.

22. A secure system for electronic voting of claim 12, comprising:

means for validating and certifying the election results by an escrow server and by a designated election official, means for providing accurate, timely and final certified results to the public soon after the polls close by leveraging computational capabilities of one or more trusted servers acting in a standalone manner and or in conjunction with each other.

23. A secure system for electronic voting of claim 12, comprising:

means for configuring a hierarchy of trusted election servers with one or more servers connected by a secure communication path and one or more servers connected by a plurality of secure communication paths;

means for locating the trusted election servers in one or more geographically separated locations, means for the trusted servers to be under the supervision of election authorities, bipartisan commissions, and neutral bodies, means for achieving redundancy in real time storage of the election data at one or more of the intelligent voting machines, the mobile voting machines, and the precinct level servers by enabling dynamic sweep of the data from each voting machine and the servers for remote and secure storage, means for defining sweep nodes, sweep periodicity from each node, and sweep duration for the dynamic sweep, means for randomly transferring the data on randomly selected redundant communication lines to limit intrusion and achieve a high level of data integrity and security.

24. A secure system for electronic voting of claim 12, comprising:

means for dynamically configuring features of the intelligent voting machine for new functions and new elections by software communication and download/upload of the functional instructions and content from a trusted local server, central server, and a network server, means for dynamically configuring features of the mobile voting machine for new functions and new elections by software communication and download/upload of the functional instructions and content from a trusted local server, central server, and a network server, means for dynamically configuring the mobile communication device with the approved functional instructions at a designated time and for designated elections using the processing power of one or more of the mobile device and one or more of a local, central and network server.

25. A secure system for electronic voting of claim 12, comprising:

means for a mobile electorate including one or more of disabled individuals, students, business travelers, and military personnel to participate in elections with ease, means for enabling a single mobile device for one or more functions including communication, computation, control, command and electronic voting functions.

26. A secure system for electronic voting of claim 12, comprising:

means for electronic voting in corporate governance matters and share holder matters, means for conducting the voting in conjunction with trusted servers/escrow servers maintained by third parties, means for using stationary and mobile devices including one or more of personal computers, laptop computers, cellular telephones, and PDAs for electronic voting.

27. A secure system for electronic voting of claim 12, comprising:
- means for using the mobile device for auction and other transactions,
- means for preventing fraud during the auction in conjunction with a trusted third party server,
- means for authentication of the parties to the auction by a trusted third party server,
- means for execution and compliance to terms by the parties to the transaction by an escrow server.

28. A secure system for electronic voting of claim 12, comprising:
- means for using the mobile device for opinion surveys,
- means for preventing fraud during conduct of the opinion survey in conjunction with a trusted third party server,
- means for authentication of the parties to an opinion survey by a trusted third party server,
- means for computation and analysis of the results by an escrow server.

29. A method comprising:
- establishing a secure communication link between a mobile device and a remote server;
- dynamically configuring the mobile device as a voting terminal;
- authenticating in real-time a voter, the authentication using an authentication protocol of the remote server and information of a voter received via the mobile device;
- presenting current issue information to the voter using the mobile device, the current issue information including one or more of audio, video, and text information of a plurality of issues for which the voter can cast votes;
- assigning an electronic key to the mobile device of the voter;
- activating the electronic key at a date and during a time period of an election, wherein the date and the time period are controlled by a location of one or more of an entity and a jurisdiction hosting the vote;
- controlling voting privileges of the voter at the mobile device during voting according to rules of one or more of the entity and the jurisdiction;
- receiving via the mobile device at least one vote cast by the voter under the voting privileges;
- recording the at least one vote in real-time at one or more of the mobile device and the remote server.

30. The method of claim 29, wherein the mobile device includes one or more of a cellular telephone, wireless communication device, Internet Protocol (IP) telephone, WiFi telephone, personal digital assistant (PDA), and personal computer.

31. The method of claim 29, wherein the configuring includes configuring an input device of the mobile device to receive the at least one vote.

32. The method of claim 31, wherein the input device includes one or more of a keyboard, a touch screen, a microphone, a receiver, an input configured to receive biometric data.

33. The method of claim 29, comprising one or more of tracking, counting, and tabulating votes in real time at one or more of the mobile device and the remote server.

34. The method of claim 33, comprising automatically counting and tabulating votes from a plurality of mobile devices without identifying the mobile devices used to cast the votes.

35. The method of claim 33, comprising presenting tabulated vote counts.

36. The method of claim 29, comprising printing at the mobile device one or more of the current issue information and the at least one vote cast.

37. The method of claim 29, wherein the authenticating includes identifying the mobile device using one or more of an IPv6 identification number, electronic identification number, and telephone number.

38. The method of claim 29, wherein the authenticating of the voter includes authentication using one or more of photographic, drivers license, passport, birth certificate, social security, identity card, video, audio, voice print, finger print, digital signature, hand writing, and signature data.

39. The method of claim 29, comprising registering the mobile device as the voting terminal with the remote server.

40. The method of claim 29, comprising registering an individual as the voter with the remote server.

41. The method of claim 29, comprising generating a voter profile of a voter using one or more of the mobile device and the remote server.

42. The method of claim 29, comprising automatically and in real-time determining eligibility of the voter.

43. The method of claim 29, comprising determining a location of the mobile device.

44. The method of claim 29, comprising converting the current issue information, wherein the converting includes one or more of text to speech conversion, speech to text conversion, image to text conversion, text to image conversion, converting from a first spoken language to a second spoken language, and converting from a first written language to a second written language.

45. The method of claim 29, comprising converting the at least one vote, wherein the converting includes one or more of text to speech conversion, speech to text conversion, image to text conversion, text to image conversion, converting from a first spoken language to a second spoken language, and converting from a first written language to a second written language.

46. The method of claim 29, comprising decoupling identification information of the voter from the vote.

47. The method of claim 29, comprising receiving identification information of a witness to the vote.

* * * * *